US012779991B2

(12) United States Patent
Saravanan et al.

(10) Patent No.: US 12,779,991 B2
(45) Date of Patent: Nov. 3, 2026

(54) SAFETY SYSTEMS IN AN AGRICULTURAL VEHICLE

(71) Applicant: Mahindra & Mahindra Limited, Chengalpattu (IN)

(72) Inventors: Natarajan Saravanan, Chengalpattu (IN); Arumugham Sivakumar, Chengalpattu (IN); Selvarasu Karmukilan, Chengalpattu (IN); Alocious Aneesh, Chengalpattu (IN); Makana Mohan, Chengalpattu (IN); Karupuusamy Bharathi, Chengalpattu (IN)

(73) Assignee: Mahindra & Mahindra Limited, Chengalpattu (IN)

( * ) Notice: Subject to any disclaimer, the term of this patent is extended or adjusted under 35 U.S.C. 154(b) by 19 days.

(21) Appl. No.: 18/612,364

(22) Filed: Mar. 21, 2024

(65) Prior Publication Data

US 2025/0010711 A1 Jan. 9, 2025

(51) Int. Cl.
*B60K 28/14* (2006.01)
*B60T 7/22* (2006.01)

(52) U.S. Cl.
CPC ................ *B60K 28/14* (2013.01); *B60T 7/22* (2013.01)

(58) Field of Classification Search
CPC .......... B60K 28/14; B60T 7/22; B60W 10/02; B60W 10/06; B60W 10/184; B60W 2050/143; B60W 2300/15; B60W 2420/403; B60W 2420/408; B60W 2420/54; B60W 2520/04; B60W 2520/105; B60W 2520/125; B60W 2520/14; B60W 2520/16; B60W 2520/18; B60W 2756/10; B60W 30/09; B60W 50/0098; B60W 50/14; B60Y 2200/22
See application file for complete search history.

(56) References Cited

U.S. PATENT DOCUMENTS

| | | | | |
|---|---|---|---|---|
| 11,390,263 | B2 * | 7/2022 | O'Connor | A01D 43/087 |
| 12,110,661 | B2 * | 10/2024 | Yoshida | E02F 9/2045 |
| 2004/0128966 | A1 * | 7/2004 | Kempf | F16H 61/0213 56/10.8 |
| 2006/0293856 | A1 * | 12/2006 | Foessel | B60W 30/09 701/301 |
| 2019/0337525 | A1 * | 11/2019 | Sippl | G06V 40/103 |
| 2024/0244987 | A1 * | 7/2024 | Ferrari | A01B 69/001 |
| 2024/0341215 | A1 * | 10/2024 | Matsuzaki | A01B 69/001 |
| 2024/0341216 | A1 * | 10/2024 | Fujii | A01B 69/008 |
| 2024/0345603 | A1 * | 10/2024 | Fujii | G06Q 50/02 |

FOREIGN PATENT DOCUMENTS

| | | | | |
|---|---|---|---|---|
| EP | 1820707 A1 * | 8/2007 | | F16H 59/06 |
| WO | WO-2018034086 A1 * | 2/2018 | | E02F 9/2033 |

* cited by examiner

*Primary Examiner* — Babar Sarwar

(74) *Attorney, Agent, or Firm* — Amster, Rothstein & Ebenstein LLP

(57) ABSTRACT

Current solutions fail to address the safety of passengers sitting or operating the agricultural vehicles. Embodiments herein discloses an automated safety system for agricultural vehicles and methods thereof, which comprises of determining the presence of one or more persons in a prohibited sitting zone of the agricultural vehicle, and providing an indication to an operator of the agricultural vehicle, on determining the presence of one or more persons in the prohibited sitting zone of the agricultural vehicle.

4 Claims, 2 Drawing Sheets

SAFETY SYSTEMS IN AN AGRICULTURAL VEHICLE

TECHNICAL FIELD

Embodiments disclosed herein relate to the operation of agricultural vehicles, and more particularly to an automated safety system for agricultural vehicles for ensuring that person(s) do not sit in a prohibited sitting zone of the agricultural vehicles, and methods of operating the safety system.

BACKGROUND

Agricultural vehicles typically operate in different types of road conditions and quite often, the agricultural vehicles carry a heavy load. For example, consider an agricultural vehicle with a trolley and other heavy implements operating on unstable surface or surfaces with low grip, such as, but not limited to, a hill side, a sloped surface, a muddy surface, a wet surface, and so on. Operating the agricultural vehicles in such conditions, especially with a heavy load, may result in accidents (such as a rollover), which can lead to fatalities.

Current solutions provide a rollover warning system for an agricultural vehicle; however, they majorly focus on rollover risk prediction and mitigation by alerting the operator of the vehicle. However, these solutions fail to address the safety of passengers siting or operating the agricultural vehicles.

Even though it's not advisable to sit on the fenders of the agricultural vehicle, especially vehicles with open cabins, such as, tractors, quite often, there are people sitting on a forbidden zone in the agricultural vehicle, such as the fenders of the agricultural vehicle.

These are some potential scenarios that may occur on the agricultural vehicle which may lead to fatal accidents. For example, the agricultural vehicle may perform a rear roll over, due to a variety of unsafe conditions or practices, such as, but not limited to, driving up a steep slope or over an obstacle, improper high hitching of an implement or chain, rapid clutch actuation, and applying excessive engine torque while pulling an implement.

OBJECTS

The principal object of the embodiments herein is to disclose an automated safety system for agricultural vehicles and methods thereof, which comprises of determining the presence of one or more persons in a prohibited sitting zone of the agricultural vehicles, and providing an indication to an operator of the agricultural vehicles, on determining the presence of one or more persons in the prohibited sitting zone of the agricultural vehicles.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

The embodiments disclosed herein are illustrated in the accompanying drawings, throughout which like reference letters indicate corresponding parts in the various figures. The embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Figure 1:
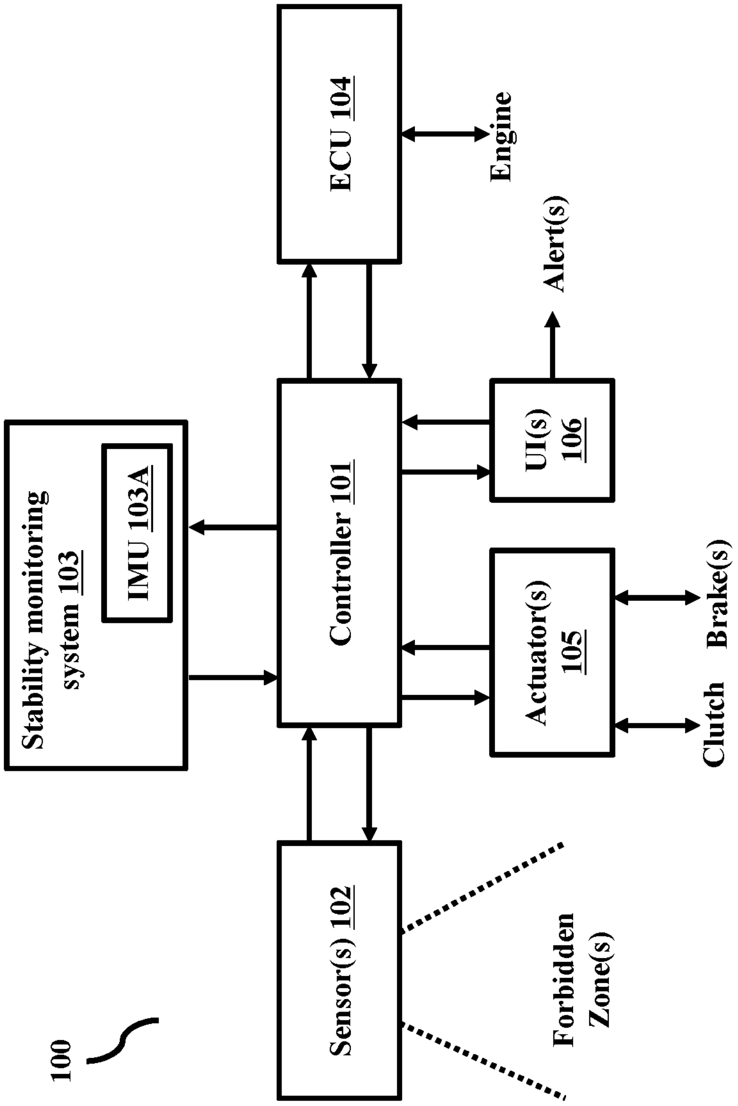
FIG. 1 depicts an automated safety system (100) in agricultural vehicles, according to embodiments as disclosed herein.
Figure 2:
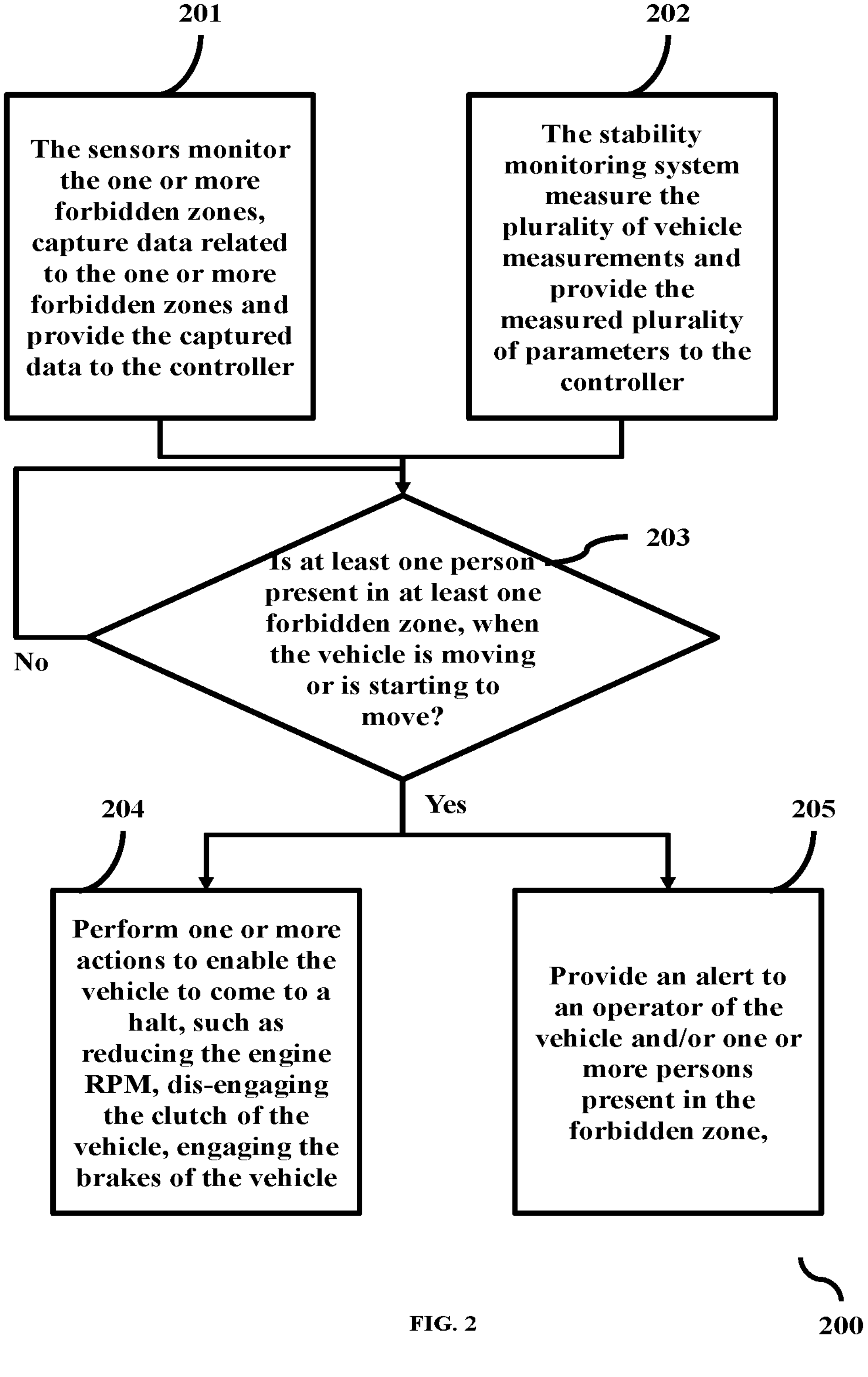
FIG. 2 is a flowchart depicting the process of managing the automated safety system in the agricultural vehicle, according to embodiments as disclosed herein.

The embodiments herein achieve an automated safety system for agricultural vehicles and methods thereof, which comprises of determining the presence of one or more persons in a prohibited sitting zone of the agricultural vehicle, and providing an indication to an operator of the agricultural vehicle, on determining the presence of one or more persons in the prohibited sitting zone of the agricultural vehicle. Referring now to the drawings, and more particularly to FIGS. 1 through 2, where similar reference characters denote corresponding features consistently throughout the figures, there are shown embodiments.

FIG. 1 depicts an automated safety system (100) in agricultural vehicles, according to embodiments as disclosed herein. The agricultural vehicle, as disclosed herein, can be a vehicle that is used for agricultural or load carrying purposes. Examples of the agricultural vehicle can be, but not limited to, a tractor, a thresher, a ploughing machine, a truck, and so on. The agricultural vehicle can have one or more zones, which can be forbidden zones. The forbidden zones can be areas on the vehicle, where humans are not supposed to be present. Examples of the forbidden zones can be, but not limited to, the bonnet, the fenders, the roof, sidesteps, and so on. The system (100) can intelligently sense the presence of one or more person in a forbidden zone and provides alerts and/or stops the vehicle, when it affects safety during operation of the agricultural vehicle.

The safety system (100), as depicted, includes a controller (101), a plurality of sensors (102), a stability monitoring system (103), an Engine Control Unit (ECU) (104), one or more actuators (105), and one or more User Interface(s) (106). The controller (101), the plurality of sensors (102), the stability monitoring system (103), the Engine Control Unit (ECU) (104), the one or more actuators (105), and the one or more User Interface(s) (106) can communicate with each other and other modules using a suitable communication means, such as, but not limited to, a Local Interconnect Network (LIN), a Controller Area Network (CAN), and so on.

The term 'controller (101),' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, the controller (101) may include at least one of, a single processer, a plurality of processors, multiple homogeneous or heterogeneous cores, multiple Central Processing Units (CPUs) of different kinds, microcontrollers, special media, and other accelerators. In an embodiment herein, the controller (101) can be a dedicated module. In an embodiment herein, the controller (101) can be a generic module, which can perform one or more other functions/tasks, in addition to embodiments as disclosed herein.

The sensors (102) can be arranged on the vehicle, so as to monitor the one or more forbidden zones. Examples of the sensors can be, but not limited to, at least one of an Infrared (IR) camera, a camera, a radar sensor, a Passive Infrared Sensor (PIR), an ultrasonic sensor, and so on. In an embodiment herein, the radar sensor can be a microwave radar sensor. The sensors (102) can capture data related to the one or more forbidden zones and provide the captured data to the controller (101).

The stability monitoring system (103) comprises an Inertial Measurement Unit (IMU) (103A), which can further comprise a plurality of monitoring sensors (not shown). The IMU (103A) can be placed anywhere in the vehicle so as to measure a plurality of vehicle measurements. In an embodiment herein, the IMU (103A) can be placed as close to the center of gravity, as possible. The plurality of monitoring sensors can measure the plurality of vehicle measurements, such as, but not limited to, longitudinal acceleration of the vehicle; lateral acceleration of the vehicle; vertical acceleration of the vehicle; roll rate of the vehicle; pitch rate of the vehicle; yaw rate of the vehicle, and combinations thereof. The IMU (103A) can provide the measured plurality of parameters to the controller (101).

Based on the data received from the sensors (102), the controller (101) can determine if at least one person is present in at least one forbidden zone. In an example, consider that the sensors (102) provide an image of a forbidden zone to the controller (101), and the controller (101) using a suitable approach such as, but not limited to, object recognition on the image, can identify if at least one person is present in the image. In an example, consider that the sensor (102) is a radar sensor and provides radar data of a forbidden zone to the controller (101), and the controller (101) can analyze the radar data to determine if an object is present in the forbidden zone and if the shape of the identified object is humanoid (i.e., at least one person is present in that forbidden zone). In an example, consider that the sensor (102) is a PIR sensor and provides infrared data of a forbidden zone to the controller (101), and the controller (101) can analyze the infrared data to determine if an object is present in the forbidden zone and if the shape of the identified object is humanoid (i.e., at least one person is present in that forbidden zone).

On detecting that at least one person is present in the forbidden zone and that the vehicle is moving (based on inputs from at least one of the ECU (104) and the stability monitoring system (103)), the controller (101) can perform one or more actions. In an embodiment herein, the controller (101) can reduce the engine Revolutions Per Minute (RPM) by reducing the inlet fuel, via the ECU (104). In an embodiment herein, the controller (101) can dis-engage the clutch of the vehicle, via the actuators (105). In an embodiment herein, the controller (101) can engage the brakes of the vehicle, via the actuators (105). This can enable the vehicle to come to a halt.

The controller (101) can further provide an alert to an operator of the vehicle and/or one or more persons present in the forbidden zone, using the UI (106). The UI (106) can provide at least one of an audio alert (such as a periodic chime, a continuous chime, a one-time chime and so on) and a visual alert (such as a light or lights on an instrument cluster of the vehicle, a light or lights on a dashboard of the vehicle, a pop up alert on a device (such as, a mobile phone, a wearable device, a tablet, and so on) used by the operator and so on. Based on the alert, the operator can further take one or more additional actions, such as, releasing the accelerator pedal, pressing the brake pedal, and so on. In an embodiment herein, the controller (101) can continue to provide the alerts to the operator, till receiving communication from the sensors (102) that the vehicle has resumed stable information or the sensor (102) does not detect at least one person in the forbidden zone.

In an embodiment herein, the controller (101) can further tailor the actions and the alerts based on a level of risk as a result of the current condition of the vehicle (as detected by the controller (101) based on data from the stability monitoring system (103)). In an embodiment herein, if the level of risk is high (i.e., the vehicle is close to losing its stability), the controller (101) can increase the periodicity and the noise and visual levels of the alerts, and further apply the brakes, and reduce the engine RPM. Based on the alert, the operator can further take one or more additional actions, such as, releasing the accelerator pedal, pressing the brake pedal, and so on. Further, based on the alerts, person(s) present in the forbidden zone can increase their grip, so as not to get injured.

In an embodiment herein, the controller (101) can determine one or more additional vehicle hazardous operation states and conditions, based on inputs received from the data received from the sensors (102) and the stability monitoring system (103).

FIG. 2 is a flowchart depicting the process of managing the automated safety system in the agricultural vehicle. In step 201, the sensors (102) monitors the one or more forbidden zones, captures data related to the one or more forbidden zones and provides the captured data to the controller (101). In step 202, the stability monitoring system (103) measures the plurality of vehicle measurements and provides the measured plurality of parameters to the controller (101). Based on the data received from the sensors (102) and inputs from at least one of the ECU (104) and the stability monitoring system (103), in step 203, the controller (101) determines if at least one person is present in at least one forbidden zone, when the vehicle is moving or is starting to move. On detecting that at least one person is present in the forbidden zone and that the vehicle is determined to be unstable (based on inputs from the IMU (103A)), in step 204, the controller (101) performs one or more actions to enable the vehicle to come to a halt, such as reducing the engine RPM, dis-engaging the clutch of the vehicle, engaging the brakes of the vehicle, and so on. In step 205, the controller (101) further provides an alert to an operator of the vehicle and/or one or more persons present in the forbidden zone, using the UI (106), wherein the alert can be at least one of an audio alert and a visual alert. Based on the alert, the operator can further take one or more additional actions, such as, releasing the accelerator pedal, pressing the brake pedal, and so on. Further, based on the alerts, person(s) present in the forbidden zone can increase their grip, so as not to get injured. In an embodiment herein, the controller (101) can continue to provide the alerts to the operator, till the sensor (102) detects that the vehicle has resumed stable motion, or the sensor (102) does not detect at least one person in the forbidden zone. The various actions in method 200 may be performed in the order presented, in a different order or simultaneously. Further, in some embodiments, some actions listed in FIG. 2 may be omitted.

Embodiments herein reduce the risks for passenger of the agricultural vehicle and increase the functional safety.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

We claim:

1. A safety system (100) in an agricultural vehicle, the safety system (100) comprising:

a controller (101);

a plurality of sensors (102); and a stability monitoring system (103), wherein the stability monitoring system (103) comprises an Inertial Measurement Unit (IMU) (103A) configured to measure at least one of longitudinal acceleration of the agricultural vehicle; lateral acceleration of the agricultural vehicle; vertical acceleration of the agricultural vehicle; roll rate of the agricultural vehicle;

pitch rate of the agricultural vehicle; and yaw rate of the agricultural vehicle using a plurality of monitoring sensors;

wherein the controller (101) is configured to:

determine presence of at least one person in at least one forbidden zone located on the agricultural vehicle based on data received from the plurality of sensors (102); and provide an alert to at least one of an operator of the agricultural vehicle and one or more persons present in the at least one forbidden zone;

performing at least one action on determining the presence of at least one person in the at least one forbidden zone located on the agricultural vehicle, when the agricultural vehicle is determined to be unstable and is moving or starting to move, based on inputs from the stability monitoring system (103), wherein the at least one action comprises at least one of:

reducing Revolutions Per Minute (RPM) of an engine of the agricultural vehicle, via an Engine Control Unit (ECU) (104);

dis-engaging a clutch of the agricultural vehicle, via at least one actuator (105); and engaging brakes of the agricultural vehicle, via the at least one actuator (105).

2. The safety system (100), as claimed in claim 1, wherein the plurality of sensors (102) is configured to monitor one or more forbidden zones, wherein the plurality of sensors (102) are at least one of an Infrared (IR) camera, a camera, a radar sensor, a Passive Infrared Sensor (PIR), and an ultrasonic sensor.

3. The safety system (100), as claimed in claim 1, wherein the Inertial Measurement Unit (IMU) (103A) is mounted as close to a center of gravity of the agricultural vehicle.

4. The safety system (100), as claimed in claim 1, wherein the controller (101) is further configured to continue to provide the alerts to the at least one of an operator of the agricultural vehicle and one or more persons present in the at least one forbidden zone, till the at least one sensor (102) detects that the agricultural vehicle is stable, or the at least one sensor (102) cannot detect at least one person in the forbidden zone.

* * * * *